United States Patent [19]  [11] Patent Number: 5,013,967
Hirotaka et al.  [45] Date of Patent: May 7, 1991

[54] ELECTROLUMINESCENCE LAMP AND METHOD OF USE THEREOF

[75] Inventors: Ito Hirotaka; Taniguchi Jinichi; Kuzushita Hirokazu, all of Amagasaki; Ohhori Atsushi, Arida, all of Japan

[73] Assignee: Mitsubishi Cable Industries Ltd., Hyogo, Japan

[21] Appl. No.: 227,256

[22] Filed: Aug. 2, 1988

[30] Foreign Application Priority Data

| Aug. 7, 1987 | [JP] | Japan | 62-122006[U] |
| Aug. 27, 1987 | [JP] | Japan | 62-130352[U] |
| Aug. 27, 1987 | [JP] | Japan | 62-130353[U] |
| Feb. 24, 1988 | [JP] | Japan | 63-23134[U] |
| Feb. 24, 1988 | [JP] | Japan | 63-23135[U] |
| Feb. 24, 1988 | [JP] | Japan | 63-23136[U] |
| Feb. 24, 1988 | [JP] | Japan | 63-23137[U] |
| Feb. 24, 1988 | [JP] | Japan | 63-23138[U] |

[51] Int. Cl.$^5$ ............................................. H05B 33/02
[52] U.S. Cl. ................................................... 313/512
[58] Field of Search .................... 313/511, 512, 514; 362/368, 370, 372, 418, 427

[56] References Cited

U.S. PATENT DOCUMENTS

| 3,317,722 | 5/1967 | Whitney . | |
| 3,430,088 | 2/1969 | Beswick . | |
| 3,509,401 | 4/1970 | Calley, Jr. et al. | 313/512 |
| 3,914,642 | 10/1975 | Coderre et al. | 313/514 |
| 4,164,009 | 8/1979 | Maguire, Jr. et al. | 362/371 X |
| 4,626,742 | 12/1986 | Mental | 313/511 X |
| 4,745,334 | 5/1988 | Kawachi | 313/512 |

FOREIGN PATENT DOCUMENTS

| 3526347A1 | 1/1986 | Fed. Rep. of Germany . |
| 3638858A1 | 5/1987 | Fed. Rep. of Germany . |

Primary Examiner—Sandra L. O'Shea
Attorney, Agent, or Firm—Wenderoth, Lind & Ponack

[57] ABSTRACT

An EL lamp has an EL light emitting part and a connector part which is connected to both electrodes of the EL light emitting part and is formed so as to be attachable to and detachable from a power supply outlet. The EL light emitting part is flat-plate-shaped and has a reinforcement to give to the EL lamp a mechanical strength against a bending load applied when repeatedly attaching and detaching the EL lamp to and from an outlet while the reinforcement is held by human fingers. Accordingly, the EL lamp is not easily broken by an external force, can be portable, and can withstand frequent attaching and detaching to and from a power supply outlet. The EL lamp can be constructed to enable changing of the illuminating direction of the EL lamp freely in desired directions. The lamp is convenient for use in an automobile having a power supply outlet with a recess into which a connector part of the EL lamp is engaged.

14 Claims, 7 Drawing Sheets

FIG_1a

FIG_1b

FIG_2

FIG_3

FIG_4

FIG_5

FIG_6

FIG_7

FIG_8(a)

FIG_8(b)

FIG_9

FIG_10(a)

FIG_10(b)

FIG_11(a)

FIG_11(b)

FIG_11(c)

FIG_14(a)

FIG_14(b)

FIG_14(c)

FIG_15

FIG_16

FIG_17

FIG_18

FIG_19

FIG_20

ELECTROLUMINESCENCE LAMP AND METHOD OF USE THEREOF

BACKGROUND OF THE INVENTION

1. Field of the Invention

The present invention relates to a flat-plate-shaped electroluminescence lamp (hereinafter referred to as an EL lamp) using an electroluminescence element (hereinafter referred to as an EL element) for a light source, specifically to an EL lamp having a mechanical tolerance of the bending load applied in attaching the element to and detaching it from a power supply outlet in a repeated manner, and a method of use thereof.

2. Description of the Prior Art

EL refers to a luminescence produced when a voltage is applied to a luminous layer wherein a phosphor such as zinc sulfide is doped with the materials of luminescence such as manganese and copper. In the luminous layer whereto a voltage is applied, the materials of luminescence (atoms serve to cause luminescence) are excited to the unstable state of high energy from the stable state of low energy, and when returning again to the stable state of low energy, they emit excess energy as light. The EL element has various features such that the thickness of the luminous layer can be made very small, for example, as thin as several dozens of microns or less, uniform light is obtainable from the whole luminous surface, various colors of luminescence are obtainable, and a heat generating action does not occur. At present, although having problems of brightness and life, such lamps have been considered to be usable for wall illumination with the whole wall acting as a light source and for small-size, light-weight displaying apparatuses in place of cathode ray tubes, and has been put in practical use partly for back lighting of meters for automobile, ships, aeroplanes, and the like, back lighting of liquid crystal displays, display portions of portable measuring equipment, panel displays for personal computers and the like.

As described above, the EL element differs basically from other luminous bodies in that the luminous layer thereof can have a thickness of about several dozens of $\mu m$, and the conventional EL lamps have made use of this feature to a maximum extent, and have been used widely for thin stationary types of lights wherein substantially no mechanical strength is required. For example, in U.S. Pat. No. 4,626,742, an EL lamp is disclosed wherein an EL element is formed on a thin film composed of polyethylene terephthalate 127–178 $\mu m$ (0.005–0.007 inch) in thickness. This EL lamp can hardly be said to have a satisfactory mechanical strength, and therefore has a problem of easy deformation by an external force, but because of this thinness, it is suitable for stationary use in a narrow place, for example, in a small-sized electronic component.

On the other hand, the present inventors have achieved the present invention on the basis of a finding that, quite the reverse to the conventional direction of development of the EL lamps, a flat-plate-shaped EL lamp having a large mechanical overall strength can respond to various requests for such lamps made in recent years as described later, even if the thickness thereof becomes a little larger.

SUMMARY OF THE INVENTION

Accordingly, an object of the present invention is to provide a novel EL lamp having quite new various effects which have not been obtained in the conventional EL lamps including the EL lamp disclosed in the above-mentioned U.S. patent.

Another object of the present invention is to provide a method of using an EL lamp.

An EL lamp in accordance with the present invention comprises an EL light emitting part and a connector part which is connected to both electrodes of the EL light emitting part and is formed so as to be attachable to and detachable from a power supply outlet, characterized by having a reinforcement to give the EL lamp a mechanical strength with respect to a bending load applied during attaching and detaching the EL lamp to and from an outlet in a repeated manner, where a portion of the EL lamp reinforced with said reinforcement is held by human fingers for attaching and detaching.

The EL lamp of the present invention comprises an EL light emitting part and a connector part. Said EL light emitting part comprises an EL element which is a light source, two electrodes, and the like.

Furthermore, the use of human fingers with which an EL lamp of the present invention is to be held is described for convenience in describing the mechanical strength with respect to a bending load, but attaching and detaching of the EL lamp to and from the outlet is not necessarily conducted only by human fingers but can also be conducted by, for example, fingers of a robot.

Remarkable effects of the EL lamp of the present invention are as follows:

(1) One of the best applications of the EL lamp is as a back light for various equipment. In producing such equipment, conventionally working procedures have been adopted by which the EL lamp is installed at a predetermined place in the process of assembling the equipment, and both electrode terminals thereof are soldered, or the connector part thereof is connected to a predetermined outlet by hand, and subsequently another member which is part of the equipment is installed on the EL lamp to cover the EL lamp. The necessity of such a complicated process is due to the thinness and fragility which is a feature of the conventional EL lamp. However, recently the desire for further reducing the cost by simplifying the production of equipment has been expressed. In this connection, the EL lamp of the present invention has a sufficiently great mechanical strength to endure the bending load applied thereto in attaching it to and detaching it from an outlet in a repeated manner, and therefore, for example, in the equipment to be produced, the minimum space needed for installing the EL lamp is provided in a portion corresponding to the place where the EL lamp is desired to be installed and then the assembling work is completed, and finally the EL lamp is inserted into the above-described space from the side wall of the equipment and simultaneously the connector part of the EL lamp can be connected to an outlet in the equipment.

(2) The EL lamp has a general problem that the brightness is reduced gradually by moisture. Therefore, in equipment incorporating the conventional stationary type EL lamp, there is a problem that the work of replacing the EL lamp whose brightness has been reduced is not easy, or only a high-class EL lamp having excellent moisture proofing can be used. On the other hand, the EL lamp of the present invention has advantages such that it can be easily inserted and attached and can be attached and detached repeatedly, and therefore the EL lamp can be attached for being used only when required and can be detached and stored in a drying room when not required, or a defective EL lamp can be easily replaced and it is not necessary that it have high quality moisture proofing.

(3) Since the EL lamp is a plane illuminating body, it is convenient for illuminating in a certain direction to install it in a stationary fashion on the ceiling or the back wall of the front seat in an automobile or on the side wall of a residential room, but when illumination in the downward or upward direction from such locations is desired, the EL lamp is required to be installed so that it protrudes from the mounting wall, and this not only spoils the appearance of the room, but incurs a risk of damaging the EL lamp by a human unintended behavior.

On the other hand, the EL lamp of the present invention can be attached and detached repeatedly, and can be attached to an outlet and used only when required, and therefore the above-described problem is not caused even if the lamp is installed so that it protrudes from a side wall. As further described later, when the EL lamp of the present invention is used together with a means capable of changing the illuminating direction thereof, the problem of appearance in a room and the danger of damaging the lamp itself are further reduced and the direction of illumination can also be changed.

(4) When the EL lamp is used as described above, it is desirable that the transport thereof can be easily performed. The EL lamp of the present invention has a mechanical strength against a bending load applied in attaching it to and detaching it from an outlet in a repeated manner, and therefore there is less possibility of damage even if it is handled a little roughly in the factory, and, for example, a card type EL lamp of card size or name card size can be carried in a dress pocket, a handbag or the like.

The EL lamp of the present invention has the advantageous effects described above, but in this connection, the conventional EL lamp as shown in the above-mentioned U.S. Pat. No. 4,626,742 has an excessively small mechanical strength against a bending load in particular, and therefore the methods of use and effects as described cannot be expected for the conventional lamp.

The EL lamp of the present invention should have a mechanical strength against a bending load applied in attaching it to and detaching it from an outlet in a repeated manner, for example, of not less than 5 times, and preferably more than 10 times, and more preferably more than 100 times. Specifically, the EL lamp of the present invention preferably has a mechanical strength against a bending load (load at breakage) of 30 kg or more measured according to the method and conditions provided in JIS K-6911 (note that only the provision as to the width of test piece is changed for the EL lamp to be tested). In addition, it is particularly preferable for the EL lamp of the invention to have a high mechanical strength against a bending load of 80 kg when measured by the above-mentioned method. Furthermore, where measured by the above-mentioned method in accordance with JIS K-6911, it is preferable that the deflection when a bending load of 5 kg is applied be no more than 5 mm.

In the present invention, the EL lamp having a reinforcement giving it a mechanical strength as described above can be made by various method and have various structures. An EL lamp is attached to and detached from the outlet in a manner such that a portion reinforced with a reinforcement is held by fingers. Said reinforcement giving an EL lamp a mechanical strength against bending load applied in attaching it to and detaching it from an outlet in a repeated manner becomes a member of the structure of an EL lamp, and accordingly, the reinforcement may be mounted over the whole of the EL lamp, or have a beam shape or a net shape, there being no particular limitation on its size or shape. As the EL lamps having a reinforcement capable of providing such a necessary mechanical strength, there is a structure wherein the reinforcement is a substrate and the EL lamp comprises that substrate and an EL light emitting part (hereinafter referred to as the substrate type), and a structure wherein the reinforcement is a casing having one or more light transmitting parts and the EL light emitting part is housed in that casing (hereinafter referred to as the casing type).

Figure 1A:
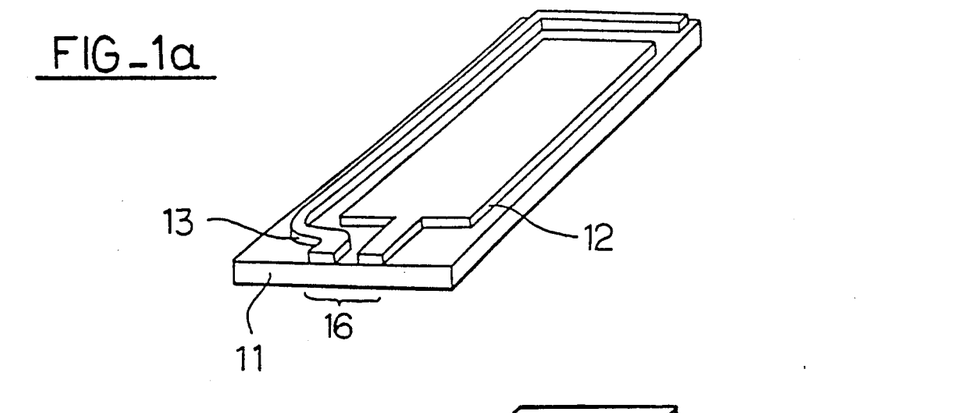
FIG. 1a perspective view of one example of a substrate having an electrode layer which is used for an EL lamp of the present invention.

The substrate type, as exemplified in FIGS. 1-4, described hereinafter, has the advantage of being an unexpectedly thin EL lamp while having the necessary mechanical strength. This is accomplished by forming the EL light emitting part on the substrate and forming terminals for both electrodes of the EL light emitting part at one end on the substrate to constitute a connector part. In this case, as shown in FIG. 1, the terminals of both electrodes may be at one end on one surface of the substrate, may be separate, or may be installed on the front and rear surfaces of the substrate, corresponding to the position of the electrodes of the power-supply outlet. Since the EL element generally has inferior water resistance, in the substrate type, at least the EL light emitting part is covered wholly with a suitable waterproof film preferably together with the substrate (other than the terminals of the electrodes).

There can be used for the substrate, for example, synthetic resins such as acryl resin, acrylonitryl butadiene styrene resin (ABS), polyvinyl chloride resin (PVC), fiberglass-reinforced epoxy resin and fiberglass-reinforced phenol resin, and insulated metal substrates having an electrically insulating resin layer of epoxy resin, fiberglass-reinforced epoxy resin, polyethylene, polyethylene terephthalate, polyvinyl chloride or the like on a metal material such as iron, stainless steel, aluminum, copper, bronze, nickel, a compound of aluminum and copper or a compound of copper and nickel.

The thickness of the substrate differs depending on the material of the substrate, and in the case of synthetic resin materials, it is generally 300–500 $\mu$m, preferably 500–2000 $\mu$m, and in the case of insulated metal substrate materials, the substrate preferably has an electrically insulating layer of 40–200 $\mu$m, particularly 50–100 $\mu$m in thickness on a metal layer of 100–1000 $\mu$m, preferably 200–500 $\mu$m in thickness.

As described above, the substrate functions as a reinforcement member for the EL lamp and gives the EL lamp a mechanical strength against a bending load applied in attaching it to and detaching it from a power supply outlet in a repeated manner. Thus, the substrate is not necessarily provided over the whole of the EL lamp and may be provided in a netlike or latticed manner.

In the casing type, the EL light emitting part is housed in a casing which can have different structures such as a half-divided case, a capsule type case with a lid, or a casing of a type wherein an insert port is sealed with molten material after the EL light emitting part has been inserted as shown in FIGS. 5-9, described hereinafter, and both electrodes thereof are connected electrically to the connector part mounted on the outer surface of a proper portion of the casing, and the casing functions as a member giving a required mechanical strength. The material of the casing may be a synthetic resin or an insulating substrate material like the above-described materials of the substrate, but at least one side of the case corresponding to the luminous surface of the EL light emitting part mounted on the interior thereof is formed of a light transmitting material, for example, polycarbonate, acryl resin or glass. Needless to say, the whole of the case may be formed of such a light transmitting material.

Unlike the above-described substrate, the casing has a three-dimensional structure, and the lightweight and hardness of the three-dimensional structure has a greater effect of giving the mechanical strength against the bending load than the substrate has. Accordingly, in general, the thickness of the material of the casing can satisfactorily be about ⅛-⅓ the thickness of the substrate.

In the casing type, the casing itself is waterproof, and has an advantage that a drying agent can be stored in the casing, if desired, along with the EL light emitting part to keep the inside of the casing in a dry state, and thereby the life of the EL element can be extended.

For the drying agent, for example, an agent in the form of powder, granular material or a sheet shape and composed of silica gel, zeolite, active carbon, magnesium oxide, calcium oxide or calcium carbonate can be used. In addition, the sheet-shaped drying agent can function as a spacer for installing the EL light emitting part in a fixed fashion in the casing. For the sheet-shaped drying agent, woven fabric or non-woven fabric carrying the drying agent, films (particularly, plastic films such as nylon, polyethylene or polyurethane) coated with the drying agent, a layer of drying agent installed between films, and a film formed by kneading the drying agent therein, can be used. The thickness thereof may be determined as desired depending on the thickness of the casing, the thickness of the EL light emitting part and the like, but normally it is about 0.1-10 mm, preferably about 0.5-5 mm.

The EL lamp of the present invention is convenient to use together with a means for changing the direction of emission of light therefrom, i.e. the illuminating direction thereof. For a means having such a function, for example, a unit consisting of a means for changing the illuminating direction of an EL lamp, an outlet connection part and an EL lamp connection part, and an element providing a means capable of changing the illuminating direction of the EL lamp can be provided.

Also, in the use of the present invention wherein the power supply outlet has an opening part capable of engaging the connector part of the EL lamp, the outlet also plays the role of supporting the connector part, and particularly, by installing such an outlet in an automobile, a portable EL lamp of the present invention can be provided for use in an automobile.

The shape of the EL lamp is not particularly limited, but the card shape is preferable because it is easy to carry. In the case of the card-shaped EL lamp, the external dimensions thereof are as follows. The width (length of the side having the connector part) is 30-300 mm for both the substrate type and the casing type, the length is 30-300 mm for both, and the thickness is 0.5-10 mm for the substrate type and 2-30 mm for the casing type.

In the EL lamp according to the present invention, the EL element serving as the light source does not have any particular limitations, and the element for practical use can be, for example, a thin-film EL element such as an element having a double insulation structure operated with AC voltage or a pulse voltage, or a powder type EL element such as a DC EL element operated with DC pulse voltage and an AC EL element operated with AC and the manufacture of the EL element itself has only to be performed in a conventional manner by the conventionally known method.

The brightness of the EL element can be varied by varying the applied voltage, and it can be operated with AC or DC voltage, and the operating voltage thereof can be of various kinds. Furthermore, the brightness of the EL element ca be varied by varying the frequency. For reference, AC driving voltages and frequencies for the EL element which have been developed up to the present are about 40-250 V and about 50-1000 Hz.

As described above, the EL element includes ones operated by DC or AC and ones having different driving frequencies, and in the EL lamp of the present invention, an EL element operating at an arbitrary voltage and frequency can be used as a light source.

Furthermore, in order to give the EL lamp of the present invention a decorative function, an EL element having various colors of luminescence may be used, and further by installing accessories such as a mirror and a timepiece together with it, the opportunity for portable use is also expanded.

In the manufacture of the substrate type El lamp of the present invention, the method of installing electrodes on the substrate is not particularly limited, and the already-known method, for example, etching of a copper-lined substrate, bonding of copper foil onto the substrate by means of an adhesive and coating of conductive paint can be used. The terminals of the electrodes forming the connector part of the EL lamp may be formed simultaneously with forming the electrodes by the above-mentioned etching method, or the terminals may be formed separately of copper foil or thin copper wires connected to the electrodes.

BRIEF DESCRIPTION OF THE DRAWINGS

FIG. 1b is a perspective view of a substrate type EL lamp using the substrate as shown in FIG. 1a;

DETAILED DESCRIPTION OF THE INVENTION

Figure 1B:
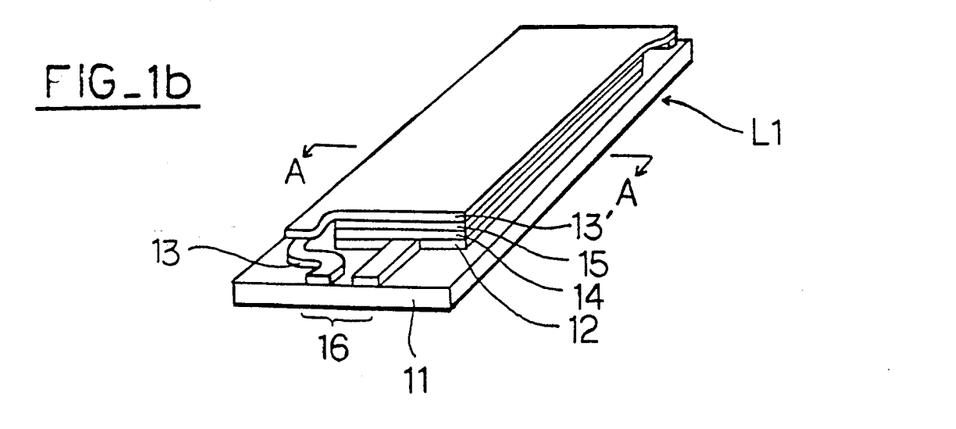
Figure 2:
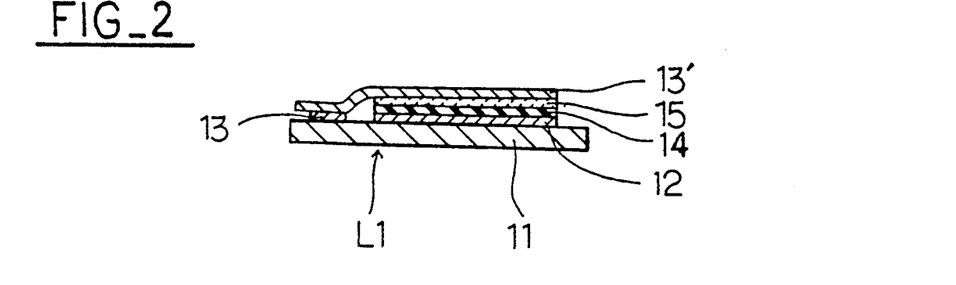
FIG. 2 is a cross-sectional view taken along line A—A of the EL lamp in FIG. 1b.

FIGS. 1a, 1b and 2 show one embodiment of a substrate type EL lamp L1 according to the present invention. Two electrodes 12 and 13 are formed on a substrate 11 in desired patterns, and a phosphor luminous layer 15 and a light transmitting electrode layer 13' are installed on the surface of the electrode 12 with an insulating layer 14 therebetween. The electrode 13 is connected to the electrode 13'. The above-described electrodes 12 and 13 form a connector part 16 at one end of the EL lamp L1, and it can be connected electrically to a power supply outlet for home or automobile. Accordingly, to reduce the contact resistance, gold plating is preferably applied to the end parts of the electrodes 12 and 13.

Figure 3:
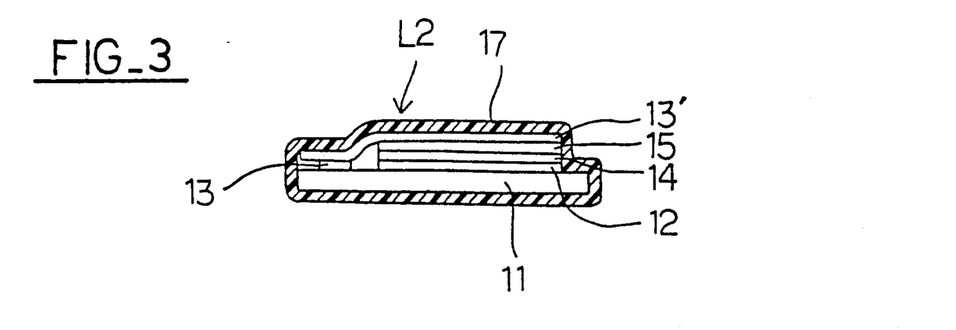
FIG. 3 is a cross-sectional view showing a modified example of the EL lamp shown in FIG. 1b.

FIG. 3 shows an EL lamp L2 of another embodiment, which is the EL lamp L1 as shown in FIG. 1b and FIG. 2 covered with a waterproof film 17 other than at the connector part 16.

Figures 4, 5:
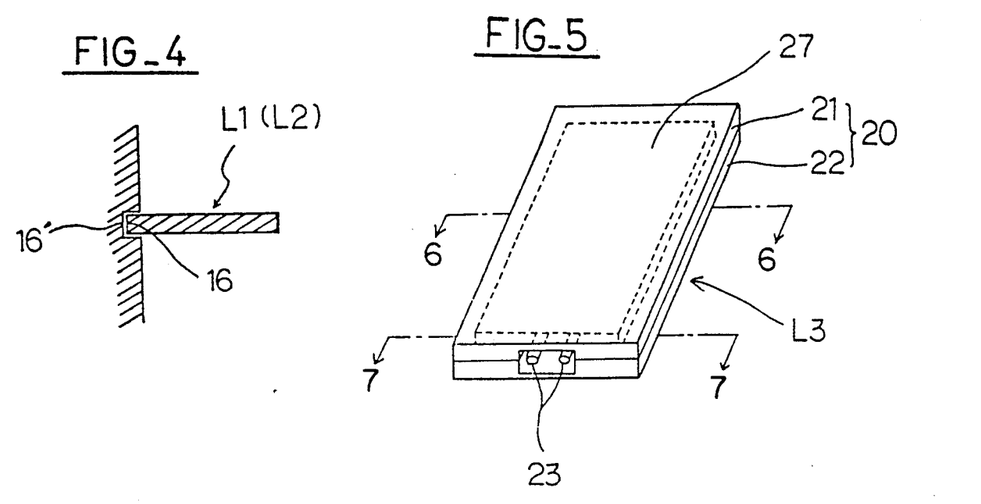
FIG. 4 is a cross-sectional view showing the EL lamp of FIG. 1b or Fib. 3 attached to a power supply outlet.
FIG. 5 is a perspective view of a casing type EL lamp using the substrate of the invention.

In using the EL lamp L1 or L2, as shown in FIG. 4, the connector part 16 of the EL lamp is connected directly to the power supply outlet of a home power supply or automobile power supply having a contact part 16' corresponding to the connector part 16, and thereby the phosphor luminous layer 15 is energized and emits light for illumination.

In addition, in the EL lamps L1 and L2 of the embodiments in FIGS. 2 and 3, each electrode, the phosphor luminous layer and the insulating layer 14 can also be placed on the back side of the substrate 11 and thereby an EL lamp in which both sides emit light can be fabricated.

Figure 6:
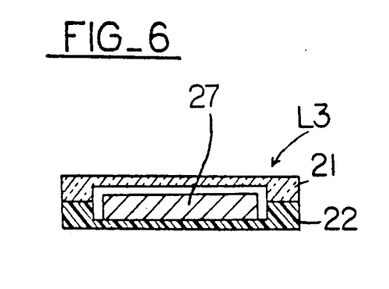
FIG. 6 is a cross-sectional view taken along line 6—6 of the EL lam FIG. 5.
Figure 7:
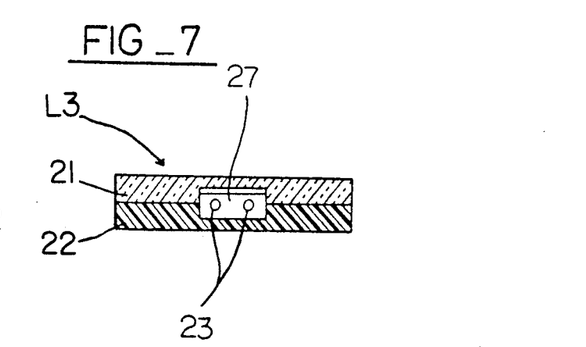
FIG. 7 a cross-sectional view taken along line 7—7 of the EL lamp in FIG. 5.

FIGS. 5-7 show a casing type EL lamp L3, in which a casing 20 is provided which is composed of synthetic resin which houses an EL light emitting part 27 having a structure similar to the above-described EL lamps L1 and L2 therein and has a relatively rigid light-transmitting front plate 21 and a relatively rigid light-transmitting or non-light-transmitting rear plate 22, and the luminous surface of the EL light emitting part 27 inside the casing 20 faces the front plate 21. Connector pins 23 connected respectively to the lead electrodes of the EL light emitting part 27 extend through the end surface of the casing 20, forming the connector part. The connector pins 23 are fixed firmly to the casing 20 so as to be able to connect electrically to the power supply outlet of a home power supply or an automobile power supply, and in this embodiment pins are used, but receptacles may be used which are different than the pins.

In using the EL lamp L3, the connector part composed of the connector pins 23 is connected to the power supply outlet of a home power supply or an automobile power supply, and thereby the EL light emitting part 27 is energized so as to light, and the emitted light is transmitted through the front plate 21 of the casing 20.

Figures 8A, 8B:
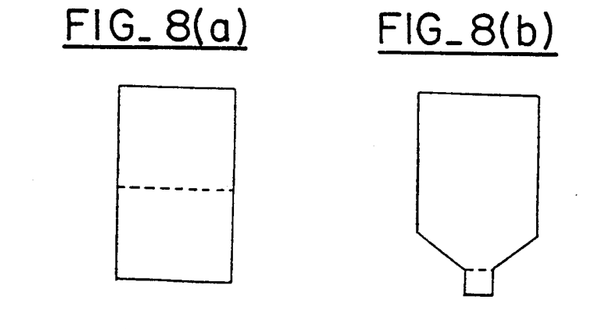
FIGS. 8(a) and 8(b) are plan views showing modified forms of the EL lamp in FIG. 5.

The external shape of the above-described respective EL lamps L1-L3 is rectangular, that is, card shape, but the EL element is thin and has great flexibility and the shape thereof can be changed freely, and therefore the shape of the EL element may be circular or oval, i.e. other than card shape, and the external shape of the EL lamp may be made circular or oval or the like corresponding to the shape of the EL element. Also, the shape of the EL lamp can be as shown in FIG. 8(a), that is, the EL lamp can be folded at the dotted line, and thereby the lamp can be carried while folded or can be bent in use. Said bendable portion (the dotted line) has a mechanical strength against a bending load applied during attaching and detaching the EL lamp to and from the outlet by human fingers, and further can be folded intentionally and easily by the force of a human hand and restored to the original state. Both the substrate type and casing type EL lamps can be bent intentionally in the manner described above. In the case of the substrate type, it is preferable that, as shown in FIG. 8(a), an EL light emitting part be installed in a portion other than the bendable portion which is made bendable by, for example, making the portion at the dotted line thin, and in the case of the casing type, bending is made possible by, for example, applying a means for bending along said dotted line. Further, as shown in FIG. 8(b), the portion of the EL lamp corresponding to the connector part is made thin, and that portion is made bendable along the dotted line and thereby the direction of illumination can be changed freely by adjusting the angle of the luminous surface of the EL lamp at that portion likewise using the method as described later.

Figure 9:
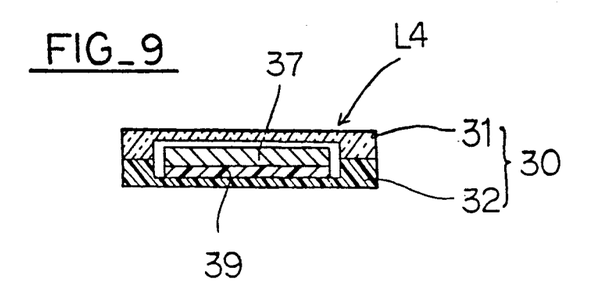
FIG. 9 is a cross-sectional view showing a modified form of the EL lamp in FIG. 5.

An EL lamp L4 as shown in FIG. 9 is a modified form of the EL lamp shown in FIG. 5, wherein a casing 30 is constituted by a front plate 31 composed of acryl resin and a back plate 32 composed of hard polyvinyl chloride, and a sheet-shaped drying agent layer 39 is placed along the inner wall of the back plate 32. The drying agent layer 39 also serves as a spacer filling the space other than that occupied by the EL light emitting part 37 in the casing 30. The drying agent 39 may be fixed to the back plate 32, or may be mounted in the casing 30 in an attachable/detachable fashion.

Because of their card shape, the above-described respective EL lamps L1-L4 are convenient for carrying, are not bulky when put in a pocket of a dress or trousers or in a handbag, and are strong so as to be able to resist an external force, and the EL lamps, particularly the connector parts thereof, are not damaged even if used for repeatedly attaching them to and detaching them from the power supply outlet, particularly where a portion of the EL lamp reinforced with a reinforcement which is, for example, a substrate or a casing, is held by the fingers for attaching and detaching.

One use of such EL lamps is as a back light source of a liquid crystal TV has been mentioned previously. Such a liquid crystal TV is constituted so that the EL lamp of the present invention can be attached to and detached from it, and the card-shaped EL lamp can be inserted into the liquid crystal TV when required as a light source.

Furthermore, as mentioned above, the EL lamp can have various colors of luminescence, and therefore it can provide decoration which creates a mysterious mood by the various colors in addition to the brightness thereof.

Next, description will be given of a method of using the EL lamp of the present invention. As described before, the EL lamps L1-L4 of the respective embodiments are used by inserting the connector part directly into the power supply outlet, and are very convenient if the illuminating direction can be changed freely by adjusting the angle of attachment of the EL lamp. For this purpose, it is only necessary to provide an illuminating direction changing means which has an outlet-side connection part for attaching to the power supply outlet and an EL lamp-side connection part to which or from which the connector part of the EL lamp can be attached or detached.

Figures 10A, 10B:
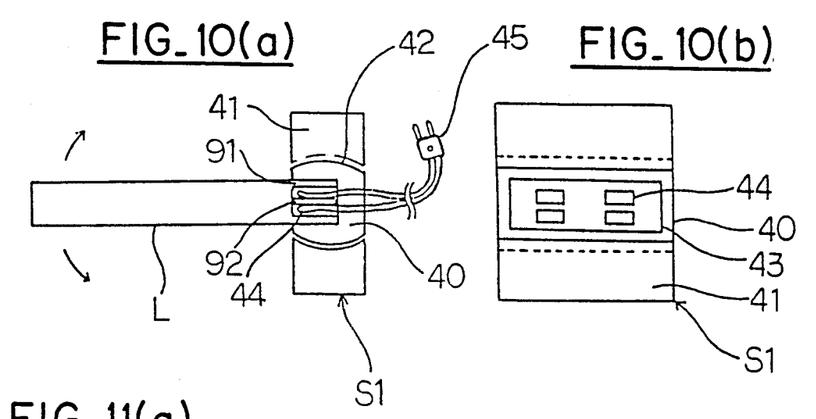
FIGS. 10(a) and 10(b) show one example of an illuminating direction changing means for an EL lamp of the present invention, FIG. 10(a) being a schematic side view showing the EL lamp attached to the changing means and FIG. 10(b) being a plan view of the changing means.

Such a changing means S1 is shown in FIGS. 10(a) and 10(b) for supporting the EL lamp L of the present invention in a manner capable of changing the illuminating direction shown by an arrow, and is constituted by a body 40 which houses a connector part 91 with which the EL lamp L can be detachably firmly connected, and a supporting body 41 for rotatably holding the body 40 and having a circular-arcshaped sliding surface 42 slidably engaged with a complementary sliding surface at the changing body 40. The position of the body 40 can be changed in the direction shown by the arrows. An opening 43 for housing the connector part 91 of the EL lamp L is formed in the changing body 40, and a connection part 44 is positioned in the opening for electrically contacting connector pins 92 positioned in the connector part 91 while holding them and clamping them. As is obvious from the drawings, the connection part 44 is connected to a plug 45 by a wire.

In such a changing means S1, when the plug 45 is inserted into a home outlet and the changing means S1 is fixed to a desk or wall, the angle of the EL lamp L can be set arbitrarily, and therefore the illuminating direction can be changed freely.

Figure 11A:
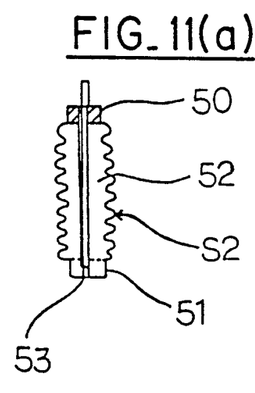
FIGS. 11(a)-(c) show another example of the illuminating direction changing means, FIG. 11(a) being a schematic side view thereof, FIG. 11(b) an end view of the EL lamp attaching part, and FIG. 11(c) a plan view with the EL lamp attached.
Figures 11B, 11C:
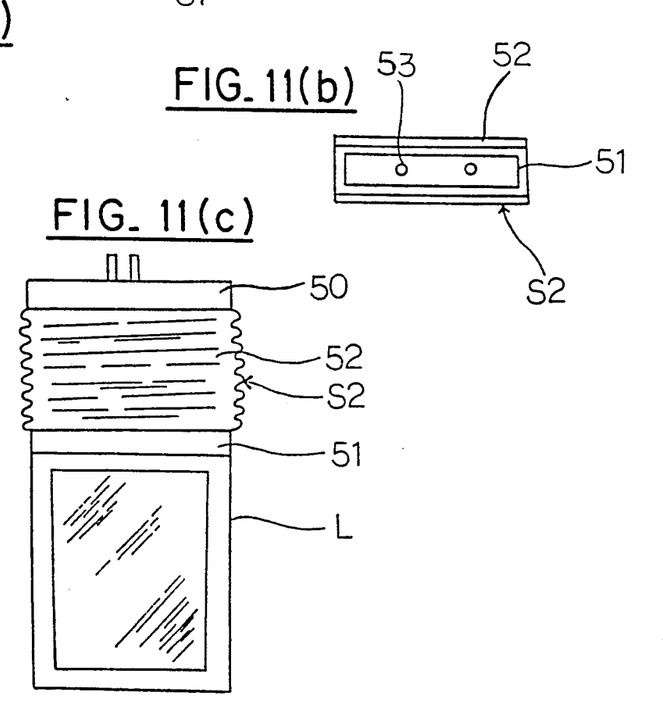

A changing means S2 as shown in FIGS. 11(a)-(c) has an outlet connection part 50 serving as a plug for inserting into a home outlet and an EL lamp connection part 51 into which connector pins (not illustrated) located in the connector part of the EL lamp L are inserted. The connection parts 50 and 51 are mechanically connected by a bellows-shaped body 52 capable of being bent, and the connection parts 50 and 51 are electrically connected by a wire installed in the body 52. Pin holes 53 into which the connector pins of the EL lamp L can be inserted are provided in the EL lamp connection part 51. The body 52 has sufficient rigidity so as not to be bent easily by the weight of the EL lamp L or external vibration, but adjustment of the angle of the EL lamp L can be made simply. The body 52 can be, for example, of metal, plastics or rubber. In this changing means S2, the outlet connection part 50 is inserted directly into the outlet, and the EL lamp L is attached to the EL lamp connection part 51, and thereby the illuminating direction of the EL lamp can be changed freely.

Figure 12A:
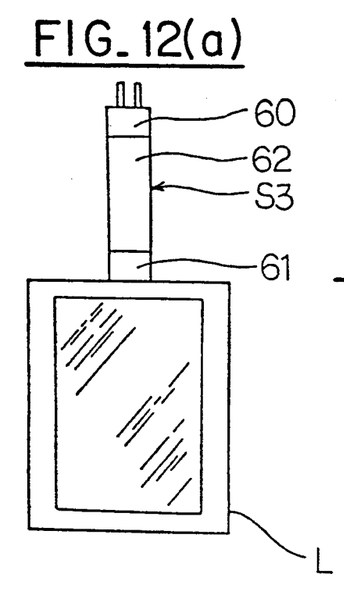
FIG. 12(a)-(c) show still another example of the illuminating direction changing means, FIG. 12(a) being a plan view with the EL lamp attached, FIG. 12(b) a schematic side view of the changing means, and FIG. 12(c) an end view of the EL lamp attaching part.
Figure 12B:
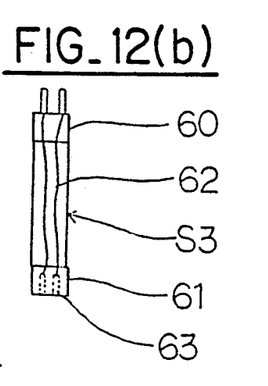
Figure 12C:
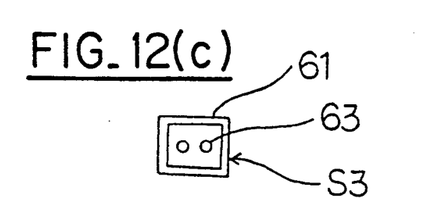

A changing means S3 as shown in FIGS. 12(a)-(c) has a shape similar to the changing means S2 as shown in FIG. 11, and is constituted by an outlet connection part 60 serving as a plug for inserting into a home outlet, an EL lamp connection part 61 into which connector pins (not illustrated) located in the connector part of the EL lamp L can be inserted and a tubular flexible body 62 which mechanically connects the connection parts 60 and 61 and can be bent and rotate freely on the connection parts. Furthermore, the connection parts 60 and 61 are electrically connected by wires in the flexible body 62, and pin holes 63 capable of receiving in electric contact the connector pins of the EL lamp L are provided in the EL lamp connection part 61. The flexible body 62 has a sufficient rigidity so as not to be displaced easily by the weight of the EL lamp L or external vibration, but the illuminating direction of the EL lamp L can be changed arbitrarily, and it can be composed of a corrugated tube, metal, plastics, rubber or the like. This changing means S3 is used in the same way as the changing means S2, and the EL lamp L can be made to change and rotate by the action of the flexible body 62, that is, the illuminating direction of the EL lamp L can be changed to any direction.

Figures 13A, 13B, 13C:
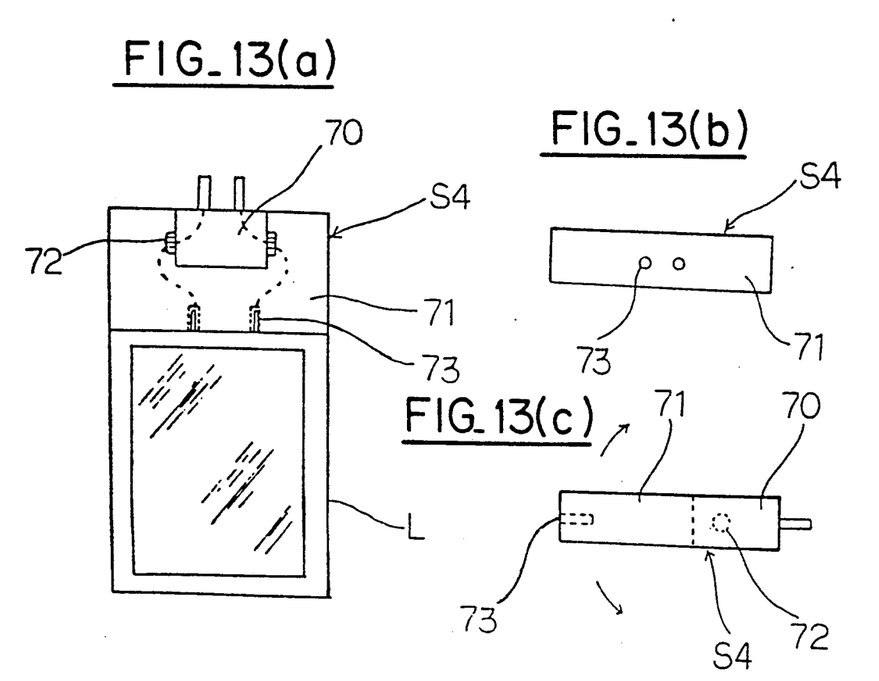
FIGS. 13(a)-(c) show still another example of the illuminating direction changing means, FIG. 13(a) being a schematic plan view with the EL lamp attached, FIG. 13(b) an end view of the EL lamp attaching part, and FIG. 13(c) a side view of the changing means.

A changing means S4 as shown in FIGS. 13(a)-(c) consists of a supporting body 70 serving also as a plug for inserting into an outlet and a connecting body 71 for being electrically and mechanically connected to the connector part of the EL lamp L. The supporting body 70 and the connecting body 71 are connected so that the body 71 can move easily on body 70 by a rotating part 72 formed on the supporting body 70 for rotating engagement with the body 71, and the rotating part 72 is constituted, for example, by a disc-shaped protrusion and a concave recess in body 71 rotatably receiving this protrusion. The protrusion may be formed in either the supporting body 70 or the connecting body 71, with the recess in the other body, and they have only to be in a corresponding positional relation. Pin holes 73 electrically receiving the connector pins of the EL lamp L are formed in the connecting body 71. In this changing means S4, the EL lamp L is mounted by inserting the supporting body into the outlet, and thereby the angle of the EL lamp L can be adjusted by pivoting the connection body 71 freely on the supporting body in the direction of the arrows in FIG. 13(c).

Figures 14A, 14B, 14C:
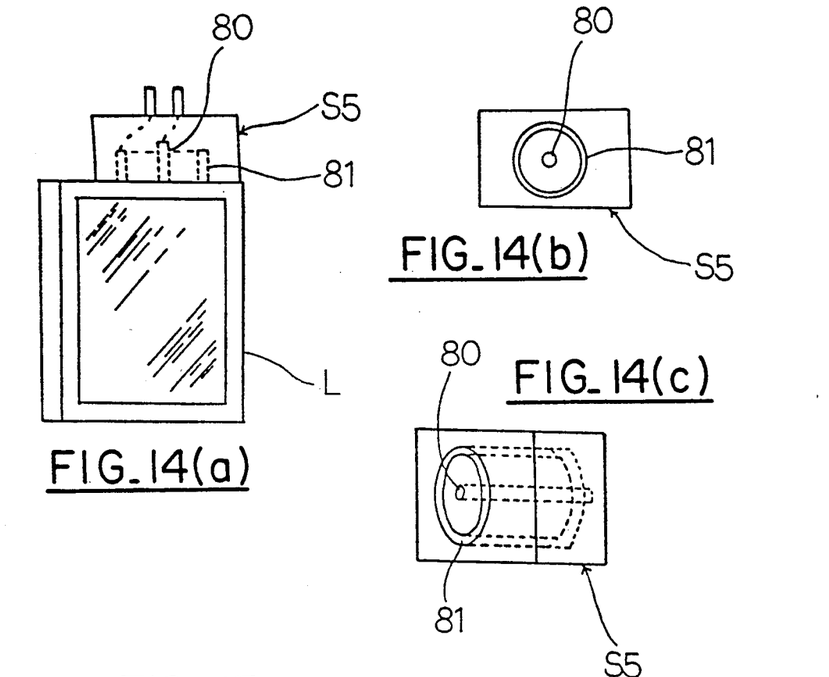
FIGS. 14(a)-(c) show still another example of the illuminating direction changing means, FIG. 14(a) being a schematic plan view with the EL lamp attached, FIG. 14(b) an end surface view of the EL lamp attaching part, and FIG. 14(c) a perspective view of the changing means.

A changing means S5 as shown in FIGS. 14(a)-(c) is for supporting the EL lamp L rotatably, and one end thereof functions as a plug and the other end electrically connects to the connector part of the EL lamp L. At said other end of the changing means S5 are provided a pin hole 80 electrically receiving one connector pin (not illustrated) of the EL lamp L and an annular pin hole 81 electrically receiving the other connector pin (not illustrated) disposed on a circle concentric with the pin hole 80, and the respective pin holes 80 and 81 are connected to the plug by wires. Accordingly, by inserting the connector pins of the EL lamp L into these pin holes 80 and 81, the EL lamp L can be rotated freely about the connector pin inserted into the pin hole 80 as an axis.

Figure 15:
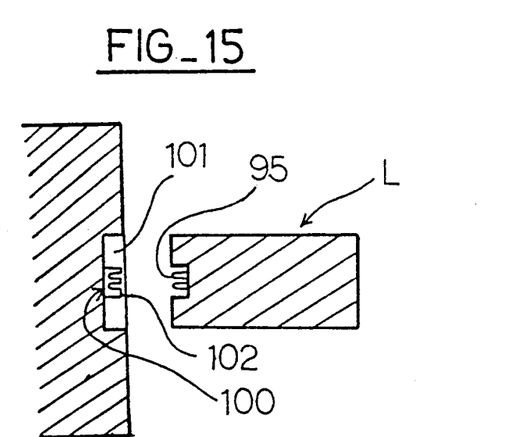
FIG. 15 is a transverse sectional view of one example of an outlet used for an EL lamp in accordance with the present invention.
Figure 16:
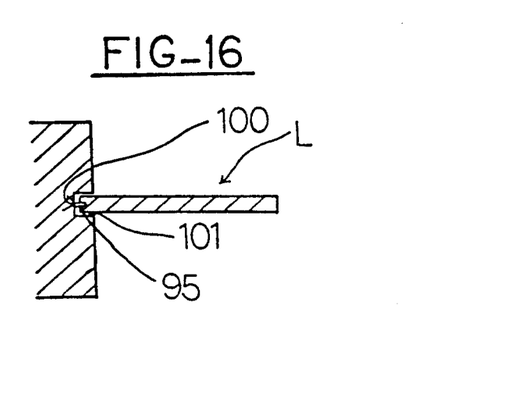
FIG. 16 is a longitudinal sectional view with the EL lamp attached to the outlet of FIG. 15.
Figure 17:
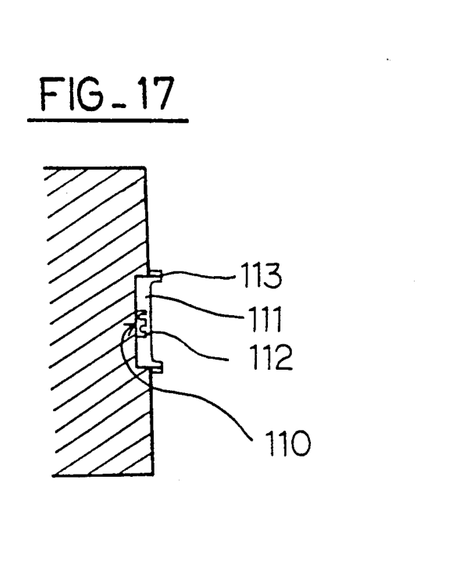
FIG. 17 is a transverse sectional view of another example of an outlet used for an EL lamp of the present invention.

FIGS. 15-17 show other examples of use. The power supply outlet as shown here has an opening part into which the connector part of the EL lamp can be engaged. Accordingly, the EL lamp is used by inserting it directly into the outlet without using the illuminating direction changing means.

An outlet 100 has a recess 101 into which a connector part 95 of the EL lamp L can be engaged, and an outlet terminal 102 electrically engagable with the connector part 95 of the EL lamp L is provided in that recess 101.

In addition, even when the outlet 100 is formed integrally on a wall or the like of a house or building, another outlet of arbitrary shape can be formed separately in advance, and may be attached to the home power supply when used.

FIG. 16 shows the EL Lamp L mounted in the outlet 100, and the connector part 95 of the EL lamp L is supported by the recess 101 of the outlet 100.

An outlet 110 as shown in FIG. 17 has an outlet terminal 112 for electrical engagement by the connector part of the EL lamp L and a supporting part 113 for supporting the EL lamp L more surely. In this case, the EL lamp L is supported firmly by the supporting part 113, and therefore the recess 111 can be made relatively shallow.

By installing an outlet 100 or 110 as shown in FIGS. 15 and 17 in an automobile, the EL lamp of the present invention can be used conveniently, and can be portable.

The EL lamps can be used in automobiles of all structures and shapes for passenger, cargo-passenger, sports, cargo, omnibus, and special uses, and on bicycles and the like. Wiring of the outlet into the electric system has only to be made by a conventional method as long as safety is maintained.

Also, the place where the outlet is installed is not particularly limited, and places where illumination is desirable at night are, for example, the lid or the inside of the glove compartment, the underside of the dashboard, the back face of the front seat, the ceiling or support in the car interior, the rear side of the engine space, the inside of the engine space, the rear side of the trunk lid, the inside of the trunk and the like.

Figure 18:
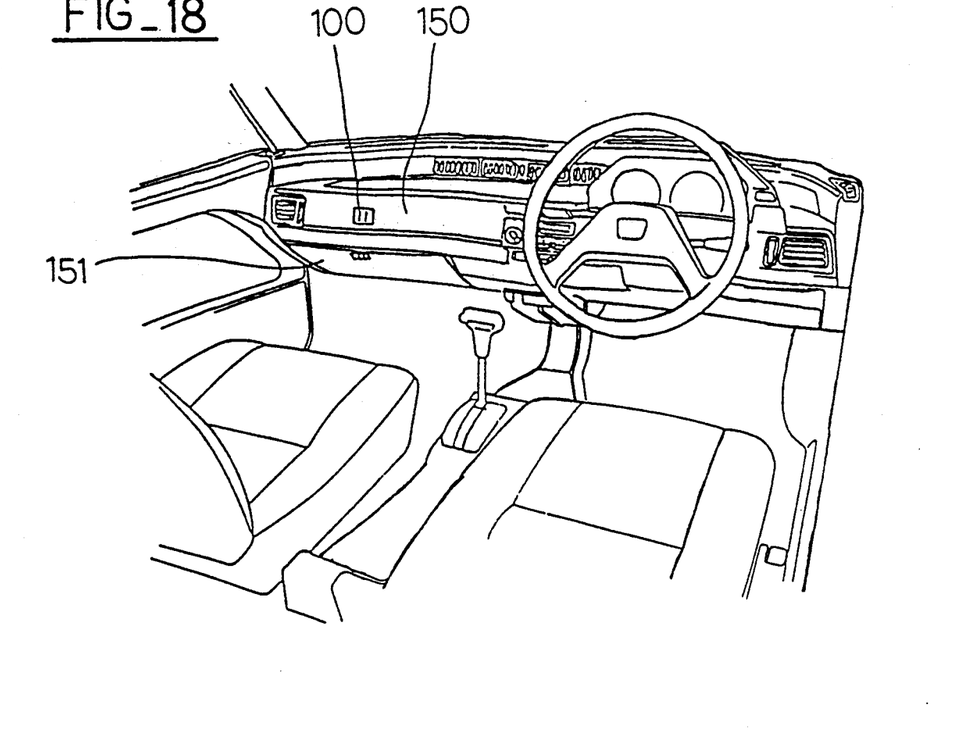
FIG. 18 is a schematic perspective view of the front part of the interior of an automobile wherein the EL lamp is for illuminating the passenger seat.

In FIG. 18, schematically showing the front part of the interior of a passenger car, the outlet 100 is installed in a position above a glove compartment 151 in an instrument panel 150. Road maps, miscellaneous articles necessary for driving and the like are usually stored in the glove compartment 151. Road maps are often taken out during driving to be consulted, particularly at night, and a map is hard to see by the light of the comparment light only, and in the case where the inside of the glove compartment 151 is dark and cannot be seen well when taking a wanted article out of the glove compartment 151, by inserting the EL lamp into the outlet 100 to light the EL lamp, the inside of the glove compartment 151 can be made bright, and the wanted article can be found easily, and further a map can be lit more clearly by the EL lamp, and difficulty in viewing can be solved. Also, by lighting the EL lamp with sufficient brightness, a book can be read in the passenger seat.

Figure 19:
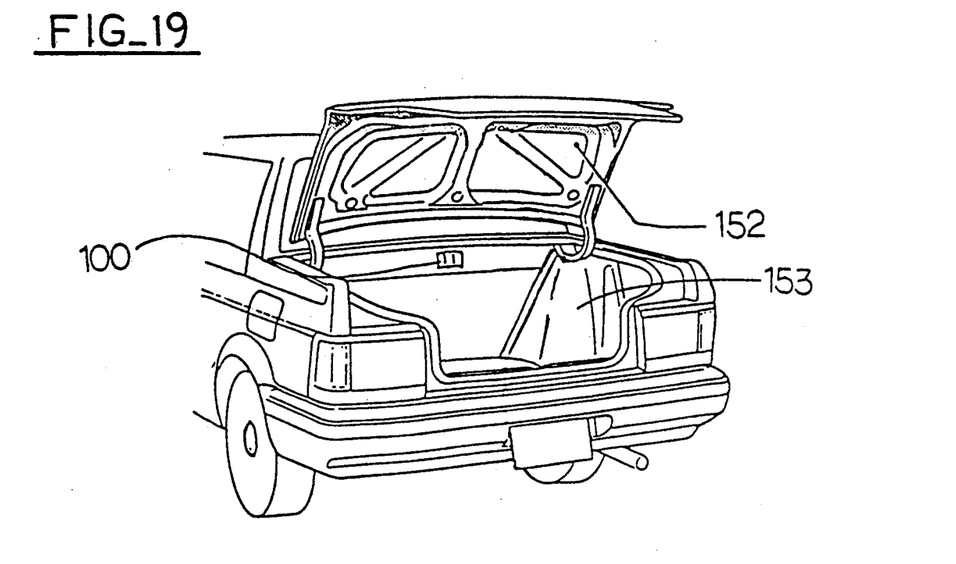
FIG. 19 is a schematic perspective view of the rear part of an automobile wherein the EL lamp is used for illuminating the trunk.

FIG. 19 shows the rear part of a passenger automobile with the trunk lid 152 opened, and the outlet 100 installed in the trunk 153. A set of repairing tools for an automobile and the like are stored in the trunk 153, and in case trouble has occurred or a tire has been punctured at night, the trunk lid 152 can be opened and the EL lamp inserted into the outlet 100 to be lit, and thereby necessary repairing tools can be taken out very conveniently, and also baggage can be loaded in and taken out with ease at night.

Figure 20:
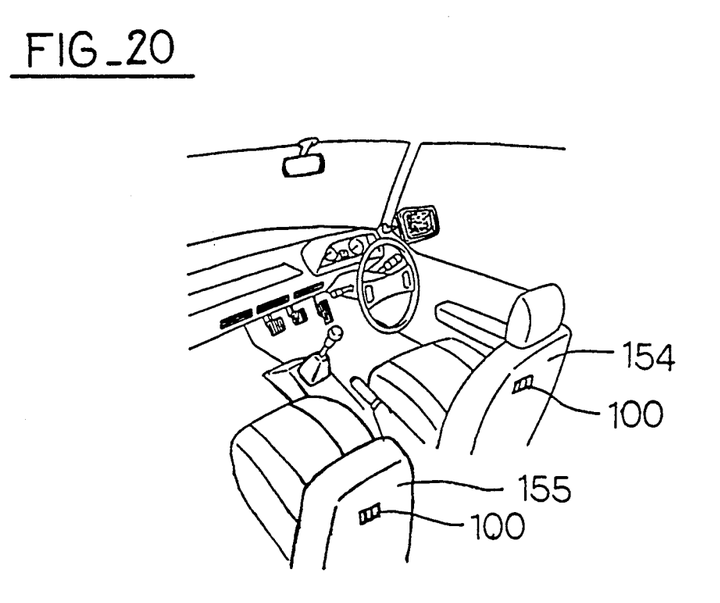
FIG. 20 is a schematic perspective view of the front part of the interior of an automobile wherein the EL lamp is used for illuminating the rear seat.

FIG. 20 shows the outlets 100 installed on the back faces of a driver's seat 154 and a passenger seat 155, and in this case, one can read a book or write letters in the rear seat.

In addition, when using the EL lamp at night, a means for showing the position of the outlet is preferably installed to make it possible to locate it easily. Specifically, for example, another EL lamp or a light emitting diode (LED) may be mounted near the outlet to be lit at night, a phosphor paint may be coated around the outlet, or a small-sized lamp may be provided to light up the outlet.

What is claimed is:

1. A flat plate-shaped electroluminescence lamp, comprising:
    an electroluminescence light emitting part having two activating electrodes;
    a connector part which is connected to said electrodes and has a shape for making it attachable to and detachable from a power supply outlet; and
    a reinforcement engaged with said light emitting part such that said light emitting part and said reinforcement together have a mechanical strength sufficient to endure a bending load of at least 80 kg according to JIS K-6911 during repeated attaching and detaching of said lamp to and from an outlet by handling of the reinforced light emitting part;
    wherein said reinforcement is a casing, said casing comprises a relatively rigid front plate and a relatively rigid rear plate extending in a longitudinal direction and connected together about their respective peripheral edges, said front plate is made of a light transmitting material, and said rear plate is made of a non-light-transmitting material; and
    wherein said casing is flat and has two opposite ends, said connector part being disposed at one of said opposite ends and extending in said longitudinal direction such that said connector part is attached and detached from a power supply outlet in said longitudinal direction of said casing.

2. The flat plate-shaped electroluminescence lamp as set forth in claim 1, wherein:
    said connector part comprises connector pins fixed to said casing and connected to said electrodes.

3. The flat plate-shaped electroluminescence lamp as set forth in claim 2, wherein:
    said casing has an end surface at said one of said opposite ends and said connector pins extends through said end surface.

4. The flat plate-shaped electroluminescence lamp as set forth in claim 1, and further comprising a drying agent housed in said casing with said light emitting part.

5. An electroluminescence lamp as claimed in claim 1, and further comprising an illuminating direction changing means, said changing means having an outlet connection part for attachment to a power supply outlet and a lamp connection part to which said connector part is detachably connectable, wherein said changing means has sufficient strength to withstand a bending force due to the weight of said lamp, and wherein when a force is exerted on said reinforced light emitting part greater than the strength of said changing means, said changing means allows said reinforced light emitting part to move to change the direction in which light is emitted from said light emitting part and holds said reinforced light emitting part in the moved position.

6. An electroluminescence lamp as claimed in claim 1, and further comprising a power outlet supply means having a recess therein for receiving said connector part for connection to a power supply and, when said recess is in a vertical wall surface, supporting said lamp in a direction extending outwardly from said wall.

7. The electroluminescence lamp as set forth in claim 1, wherein said front and back plates are made of synthetic resin.

8. The electroluminescence lamp as set forth in claim 7, wherein said front plate is made of acryl resin and said back plate is made of polyvinyl chloride.

9. A flat plate-shaped electroluminescence lamp, comprising:
an electroluminescence light emitting part having two activating electrodes;
a connector part which is connected to said electrodes and has a shape for making it attachable to and detachable from a power supply outlet; and
a reinforcement engaged with said light emitting part such that said light emitting part and said reinforcement together have a mechanical strength sufficient to endure a bending load of at least 80 kg according to JIS K-6911 during repeated attaching and detaching of said lamp to and from an outlet by handling of the reinforced light emitting part;
wherein said reinforcement is a casing, said casing comprises a relatively rigid front plate and a relatively rigid rear plate extending in a longitudinal direction, and at least said front plate is made of a light transmitting material;
wherein said casing is flat and has two opposite ends, said connector part being disposed at one of said opposite ends and extending in said longitudinal direction such that said connector part is attached and detached from a power supply outlet in said longitudinal direction of said casing;
wherein said connector part comprises connector pins fixed to said casing and connected to said electrodes; and
wherein said casing has an end surface at said one of said opposite ends and said connector pins extends through said end surface.

10. The flat plate-shaped electroluminescence lamp as set forth in claim 9, and further comprising a drying agent housed in said casing with said light emitting part.

11. An electroluminescence lamp as claimed in claim 9, and further comprising an illuminating direction changing means, said changing means having an outlet connection part for attachment to a power supply outlet and a lamp connection part to which said connection part is detachably connectable, wherein said changing means has sufficient strength to withstand a bending force due to the weight of said lamp, and wherein when a force is exerted on said reinforced light emitting part greater than the strength of said changing means, said changing means allows said reinforced light emitting part to move to change the direction in which light is emitted from said light emitting part and holds said reinforced light emitting part in the moved position.

12. An electroluminescence lamp as claimed in claim 9, and further comprising a power outlet supply means having a recess therein for receiving said connector part for connection to a power supply and, when said recess is in a vertical wall surface, supporting said lamp in a direction extending outwardly from said wall.

13. The electroluminescence lamp as set forth in claim 9, wherein said front and back plates are made of synthetic resin.

14. The electroluminescence lamp as set forth in claim 13, wherein said front plate is made of acryl resin and said back plate is made of polyvinyl chloride.

* * * * *